United States Patent [19]

Blom

[11] Patent Number: 4,734,775

[45] Date of Patent: Mar. 29, 1988

[54] CAMERA FOR RECORDING TELEVISION, PHOTOGRAPHIC OR CINEMATOGRAPHIC IMAGES

[75] Inventor: Hendrik Blom, Breda, Netherlands

[73] Assignee: U.S. Philips Corporation, New York, N.Y.

[21] Appl. No.: 892,522

[22] Filed: Aug. 1, 1986

[30] Foreign Application Priority Data

Aug. 30, 1985 [NL] Netherlands .................. 8502379

[51] Int. Cl.[4] .............................................. H04N 3/14
[52] U.S. Cl. .......................... 358/213.16; 358/213.26; 358/221
[58] Field of Search ...................... 358/213.23, 213.25, 358/213.26, 213.27, 213.31, 221

[56] References Cited

U.S. PATENT DOCUMENTS

| | | | |
|---|---|---|---|
| 4,498,105 | 2/1985 | Crawshaw | 358/213.25 |
| 4,589,025 | 5/1986 | Monahan et al. | 358/213.26 |
| 4,635,126 | 1/1987 | Kinoshita | 358/213.26 |
| 4,644,287 | 2/1987 | Levine | 358/213.26 |

Primary Examiner—Jin F. Ng
Assistant Examiner—Stephen Brinich
Attorney, Agent, or Firm—Algy Tamoshunas; Gregory P. Gadson

[57] ABSTRACT

The camera has a solid-state image sensor (FTD) comprising a pick-up member (I), a storage member (M) and a shift register member (SR) having three output shift registers (SR1, SR2, SR3). The picture signals (S1, S2, S3) originating from the output registers must be combined in a monochrome camera or a color camera with several image sensors to form a balanced composite picture signal (S0). To this end, the camera comprises a control system for fixing one and the same black level in the three picture signals. Via the control system including a common differential amplifier (AM) and multiplex (MUXa, MUXb) and demultiplex circuits (DEMUX), signal reset levels are fixed in the three picture signals (S1, S2, S3) with the aid of peak rectifier circuits (PR1, PR2, PR3) in such a manner that more or less the same signal black level occurs in the picture signals.

4 Claims, 4 Drawing Figures

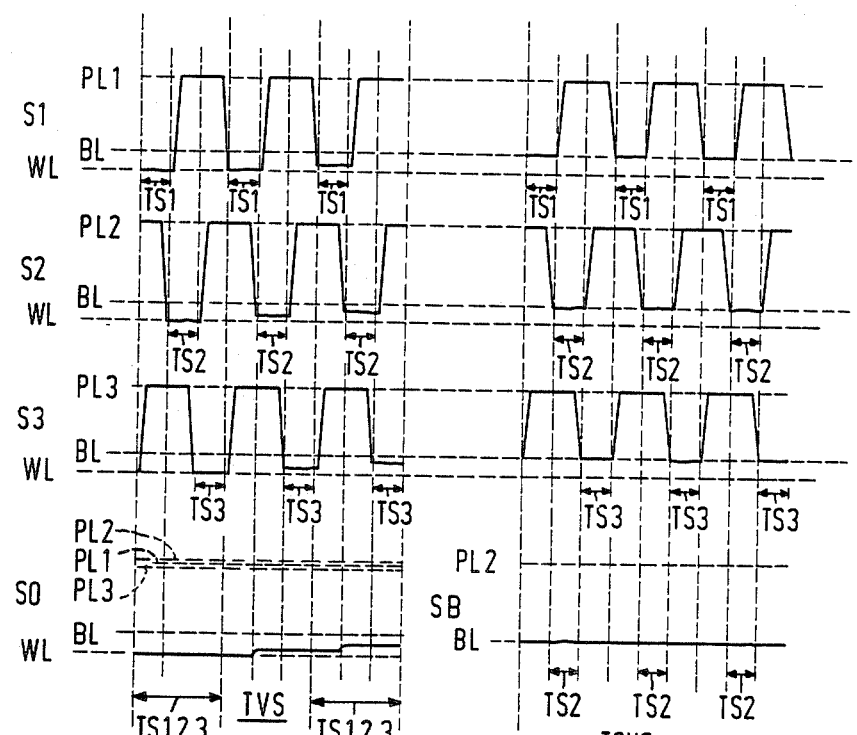
FIG.2
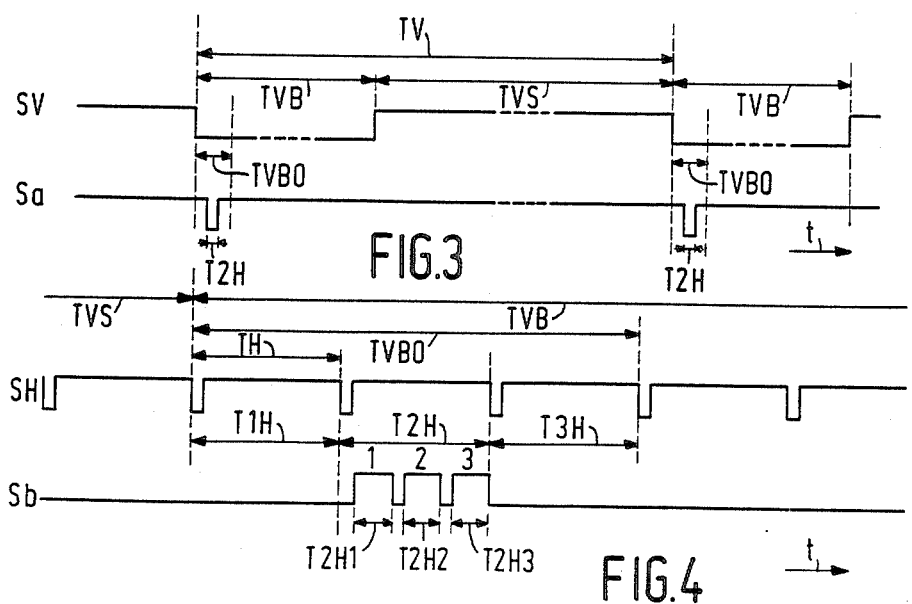
FIG.3
FIG.4

CAMERA FOR RECORDING TELEVISION, PHOTOGRAPHIC OR CINEMATOGRAPHIC IMAGES

BACKGROUND OF THE INVENTION

The invention relates to a camera for recording television, photographic or cinematographic images, including a solid-state image sensor in the form of as a charge transfer device comprising a pick-up member, a storage member and a parallel-in, series-out shift register member having at least two shift registers, each being coupled to a distinct sensor output terminal, said storage and shift register members being shielded from incident light and said pick-up member being shielded from incident light over a strip, the image sensor in said camera being operative for obtaining a picture signal having a periodical picture information associated with a scene to be recorded and a periodical dark current information originating from below the said strip and being associated with a signal black level, said picture signal being obtained after a picture information integration period in the pick-up member and a charge transfer period for the transfer between pick-up member and storage member.

A camera of this type, particularly for television, has been described in an English language technical publication no. 150, of the Philips Electronic Components and Materials Division, issued on Jan. 11, 1985, in which the solid-state image sensor is a so-called frame-transfer sensor which is mentioned as an atrractive alternative to the television camera tube. The shift register member has three parallel shift registers which in case of a colour recording based on three primary colours each apply a picture signal corresponding to a given colour to one of the three output terminals. For this purpose construction of the image sensor is availabe with a colour strip filter placed in front of it. Another construction without a colour strip filter is suitable for use in black/white recording or a colour recording with several image sensors. The dark current information originating from below the said shielding strip in the pick-up member occurs in all three picture signals, independent of the construction.

When the described image sensor is used in a black/-white or monochrome camera or in a colour camera having more than one image sensor, for example, three, the picture signals originating from the three output shift registers and occuring at the three output terminals of the image sensor are to be combined to one composite camera picture signal. The use of three output shift registers in the image sensor provides the advantage in production that one and the same image sensor construction can be used for both black/white recording and colour recording with one image sensor, apart from the additional provision of the colour strip filter. In addition there is the advantage of the higher pixel density in the television line scan i.e. the horizontal direction than in the case of the use of a single output shift register. In fact, the limited minimum width of the control electrodes in the image sensor imposes a limit on the minimum horizontal distance between charge packets in the image sensor and this distance is reduced by a factor of three when three shift registers are used.

With the two advantages described there is the problem in monochrome camera or the colour camera having several image sensors that the contributions of the picture signals originating from each of the three output shift registers to the composite camera picture signal should be equally large. Scene pixels having the same information content must occur in the camera picture signal with more or less the same signal value between black level and peak white level. In practice especially differences between the black levels in the three picture signals originating from the shift registers are found to be inadmissible so that no balanced composite picture signal can result without any further measures. Upon display of such an unbalanced composite picture signal a troublesome interference pattern of vertical stripes if found to occur.

SUMMARY OF THE INVENTION

It is an object of the invention to realise a camera in which the composition of at least two picture signals originating from separate shift registers of an image sensor leads to a balanced, composite camera picture signal. To this end a camera according to the invention is characterized in that each sensor output terminal is coupled via an associated peak rectifier circuit for a signal reset level to an associated input of a multiplex circuit having two outputs for a respective coupling to a camera output terminal for supplying a composite camera picture signal, and to a terminal connected to a capacitor terminal for carrying the signal black level, the latter terminal being coupled to an input of a differential amplifier circuit another input of which has a reference voltage circuit connected to it, an output of the differential amplifier circuit being coupled via a demultiplex circuit to series arrangements of a signal storage circuit and a control voltage circuit, each series arrangement being coupled to one of the associated peak rectifier circuits for applying a control voltage thereto to fix the signal reset level.

The invention is based on the recognition that a balanced composite camera picture signal can be obtained by means of the multiplex demultiplex control system comprising the common differential amplifier circuit and by means of the specific control voltage obtained via one of the said series arrangements for each peak rectifier circuit, so that the originally different signal black levels are made substantially equal prior to composition being effected. The fact that the differential amplifier circuit is common is essential because voltage and/or current level deviations that are always present during signal processing in this circuit have the same effect for the signal channels succeeding the sensor output terminals.

An embodiment of a camera according to the invention, having an optimum control system is characterized in that the multiplex circuit, the reference voltage circuit, which has a swichable construction, and the demultiplex circuit switch synchronously during at least one television line period in which dark current information is present in the picture signals.

A camera embodiment having a control system operating at high speed is further characterized in that synchronous switching is regularly distributed over one line period.

An embodiment of a camera having a simple switchable and adjustable reference voltage circuit is characterized in that the reference voltage circuit which has a switchable construction comprises a multiplex circuit and hence adjustable reference voltage circuits connectable to the input of the differential amplifier circuit, each reference voltage circuit being associated with one of the respective peak rectifier circuits.

BRIEF DESCRIPTION OF THE DRAWINGS

The invention will be described in greater detail by way of example with reference to the accompanying drawing, in which FIG. 2 shows some signal diagrams as a function of time to illustrate the operation of the camera of FIG. 1, FIG. 3 shows some signal diagrams based on a television field period to clarify the operation, and FIG. 4 shows some signal diagrams based on a television line period for further clarification.

DETAILED DESCRIPTION OF THE INVENTION

Figure 1:
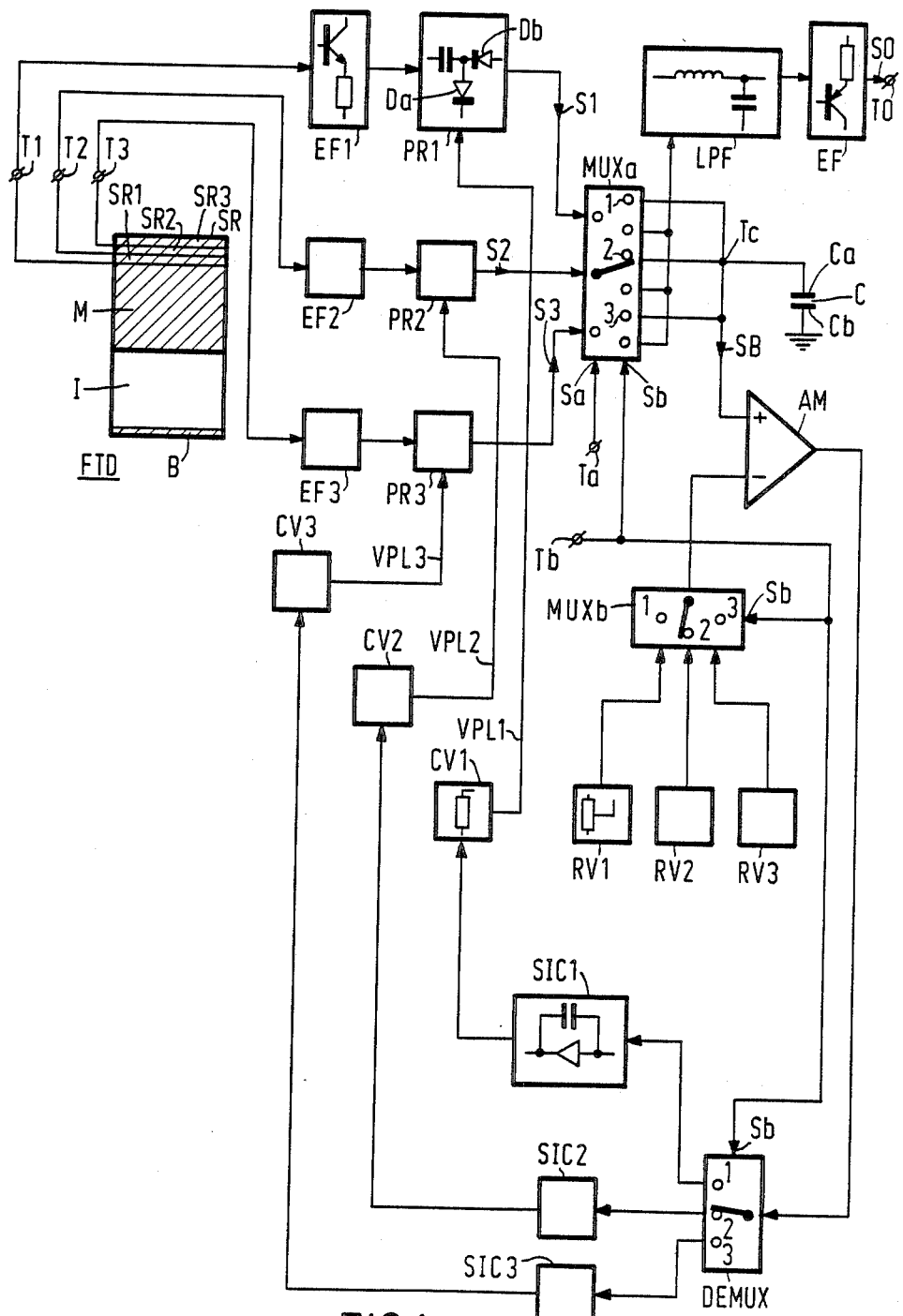
FIG. 1 is a block diagram of an embodiment of a camera according to the invention.

In the camera according to the invention which is shown in a block diagram in FIG. 1, the reference FTD denotes a solid-state image sensor which, as is illustrated by means of a block diagram, is in the form of a charge transfer device, more specifically as what is commonly referred to as a Frame Transfer Device. The sensor FTD is in the form of an integrated circuit comprising a pick-up member I, an adjacent storage member M which is shielded from light and adjacent thereto a parallel-in series-out shift register member SR which is also shielded from light and has three output shift registers SR1, SR2 and SR3. The light shields are shaded in FIG. 1 in which furthermore the pick-up member I is provided with a strip-shaped shield B. The construction and the operation under the control of clock pulse signals to be applied is described in detail in the said publication and in U.S. Pat. No. 3,824,337 which is included herein by reference. The pick-up member I and the storage member M are constructed from pick-up and storage elements, respectively, which are arranged in rows and columns, a charge transfer occurring periodically in the column direction in the members I and M and between them. According to the publication the storage member M and the pick-up member I comprise 294 rows of storage and pick-up elements. Light originating from a scene to be recorded is converted in the pick-up member I during a picture information integration period into charge packets which reach one of the three output shift registers SR1, SR2 and SR3 after a charge transfer period via the storage member M. According to the said publication three rows of elements are present in the member I under the strip B. These three rows of elements may serve for a dark current measurement and an associated black level clamping.

Instead of the described construction of the sensor FTD with the adjacent members I, M and SR a storage member arranged in the integrated circuit under the pick-up member I may be used. In this situation it should be ensured that light incident on the pick-up member I does not reach the storage member and the shift register member. The pick-up member I then ensures the shield against light. The charge transfer from the pick-up member I to the storage member can now be effected directly from each pick-up element to the subjacent storage element, whereafter the charge transfer can be effected in the column direction in the storage member to the shift register member.

A further example of a construction of an image sensor is that in which the shift register member is in the form of the base of a comb which is shielded from light and whose teeth constitute the storage member. The pick-up elements of the pick-up member are arranged in columns between the teeth of the storage member. In this example the pick-up elements may also have a direct charge transfer to the adjacent associated storage elements. A sensor having such a construction is sometimes referred to as an interline transfer device.

For another example of the construction of an image sensor having various output shift registers reference is made to U.S. Pat. No. 4,475,125. The censor described is operative in the semiconductor body with an information flow of electrons and an information flow of holes, while the two information flows become separately available at two output terminals via two output shift registers.

Independent of the specific construction of the image sensor it is assumed that a black/shite or monochrome camera or a colour camera provided with several image sensors has at least one image sensor provided with at least two output shift registers, with the specific sensor FTD having three shift registers SR1, SR2 and SR3 shown as an example in FIG. 1. In FIG. 1 the sensor FTD is shown wthout the control circuits required therefor for which reference is made to the said publication. Under the control, picture signals become available at sensor output terminals T1, T2 and T3 connected to the respective shift registers SR1, SR2 and SR3. Supply voltages for the sensor FTD and for further components in the camera according to FIG. 1 have not been shown for the sake of simplicity. Furthermore connection leads have been shown as single wires for the sake of simplicity, but they may be alternatively of a multiple design in practice and independent thereof they may comprise signal processing circuits.

In the camera of FIG. 1 the picture signals occurring at the output terminals T1, T2 and T3 are to be combined in a balanced manner to a composite camera picture signal S0 occurring at a camera output terminal T0. In the case in which the camera picture signal S0, after having been submitted to further signal processing operations which are cutomary in television, is used for television reproduction, the camera shown in FIG. 1 operates as a black/white or monochrome television camera. Another possibility is to process the camera picture signal S0 into a signal suitable for cinefilm reproduction so that the camera shown in FIG. 1 forms part of a cinefilm camera as a pick-up member. A further possibility is to process the camera picture signal S0 to form a photograph or a slide so that the camera of FIG. 1 forms part of a photographic camera as its pick-up member. A camera having several image sensors may be operative for colour recording or for three-dimensional recording. Independent of the specific camera construction it is required in all cases to compose the picture signal S0 in a balanced manner, that is to say, the picture signals occurring at the sensor output terminals T1, T2 and T3 have more or less the same picture signal value for one and the same scene information content of a pixel.

To form the camera picture signal S0 each sensor output terminal T1, T2 and T3 is coupled to an input of a multiplex circuit MUXa via a series arrangement of emitter-follower circuits EF1, EF2 and EF3, respectively, and peak rectifier circuits PR1, PR2 and PR3, respectively. An emitter, follower circuit is further indicated with a transistor and a resistor. A peak rectifier circuit is shown with a capacitor which is succeeded by two diodes Da and Db connected in opposite current directions. The diode Da is operative as a clamping diode and the diode Db operates as a peak rectifier diode. The diodes Da and DB are shown by way of example and the circuits PR may further comprise transistors. The circuit MUXa is shown with two groups of three interconnected outputs so that effectively two outputs are present one of which is coupled to the camera output terminal T0 for the supply of a composite picture signal via a low-pass filter LPF (shown with a coil and a capacitor) in series with an emitter follower circuit EF. In this manner a signal channel (EF, PR) succeeds each sensor output terminal T1, T2 and T3, respectively, through which a picture signal denoted by S1, S2 and S3, respectively, is applied to the circuit MUXa. To illustrate the operation of the camera of FIG. 1, FIG. 2 shows some signal voltage diagrams of the picture signals S1, S2 and S3 as a function of time t Furthermore, the Figure shows during a portion of time of the diagram the resultant voltage diagram of the picture signal S0 and during another portion of time it shows the voltage diagram of a black level signal SB. FIG. 2 shows some voltage levels such as reset levels PL1, PL2 and PL3, a signal black level BL and a signal peak white level WL. The references TS1, TS2 and TS3 denote pixel periods and TS123 denotes pixel cycle periods.

The signals S1, S2 and S3 are shown in FIG. 2 with a form emanating from the known charge packet construction caused by the image sensor FTD of FIG. 1. The signals S1, S2 and S3 show picture signals with the periodical picture information occurring in a first period between the black level BL and the peak white level WL. The difference between the voltage levels BL and WL may be, for example, 300 mV. Consecutive pixel information components have been given by way of example for the signals S1, S2 and S3, which components have a variation if four times peak white (WL), three times a grey tint and twice a still greyer tint, near black. In a second period the signals S1, S2 and S3 have the periodical dak current information components occurring between the respective reset level PL1, PL2 or PL3 and the black level BL. The difference between the voltage levels PL1, PL2 or PL3 and BL may be, for example, of the order of 1.5 V. Deviations in the signal processing operations in the shift registers SR1, SR2 and SR3 lead to the differences between the reset levels PL. By using the invention the same black level BL is obtained in the signals S1, S2 and S3 in a manner to be described hereinafter. The picture signal S0 shown in FIG. 2 occurs, inter alia, in a period TVS which will be further indicated as a television field scan period in FIG. 3. The signal S0 is shown resulting from the signals S1, S2 and S3 shown, whilst the low-pass filter LPF yields a smoothing of the pixel values. The diodes Db considered to be present in the circuits PR1, PR2 and PR3 cause the lowest signal value of the signals S1, S2 and S3 to occur in the signal S0. The black level signal SB shown in FIG. 2 occurs in a period T2H2 which according to FIG. 4 comprises a second time portion of a television line period T2H. FIGS. 3 and 4 show some signal diagrams based on television field and line periods, respectively. FIG. 3 shows for two signals SV and Sa a television field period TV with a field blanking period TVB and the field scan period TVS. During the period TVB there is a dark current information period indicated by TVB0 in which the line period T2H occurs. In FIG. 4 the periods shown in FIGS. 2 and 3 have the same references. It appears from a signal SH that the dark current information period TVB0 comprises three line periods TH which are consecutively indicated by T1H, T2H and T3H. The line periods T1H, T2H and T3H are associated with the three rows of elements located under the strip B of the member I of the sensor FTD as shown in FIG. 1. A signal Sb shows three consecutive pulses 1, 2 and 3 having equal periods T2H1, T2H2 and T2H3 during the second line period T2H. The signal SH is shown as a television line synchronising signal, whilst the signal SV can be considered to be a field synchronising signal with the associated blanking information. The line periods TH are associated with an interlaced or non-interlaced television line raster. In FIG. 1 the signals SV and SH which are considered to be present in known manner as camera synchronising signals are not shown for the sake of simplicity. The signals Sa and Sb will appear to be operative as switch-over signals for multiplex or demultiplex circuits and occur at terminals Ta and Tb, as is apparent from FIG. 1.

The camera of FIG. 1 will be further described with reference to the signal diagrams shown in FIGS. 2, 3 and 4. The multiplex circuit MUXa is shown with connection terminals associated with inputs and outputs thereof. The group output coupled to the filter LPF is associated with terminals which are not further indicated by reference numerals. The reference numerals, 1, 2 and 3 denote multiplex terminals associated with a second group output of the multiplex circuit MUXa, which output is coupled to a terminal Tc. The circuit MUXa receives the switch-over signal Sa of FIG. 3 via the terminal Ta, so that outside the line period T2H the three inputs are simultaneously connected to the three interconnected outputs which are connected to the filter LPF. The diodes Db present in the circuits PR cause the signal S1, S2 or S3 with the instantaneous lowest signal value to occur in the signal S0. The circuit MUXa receives the switch-over signal Sb of FIG. 4 via the terminal Tb so that within the line period T2H the three inputs are sequentially connected to the output terminals 1, and 3. In connection with FIG. 2 the switch-over signal Sb illustrates that during the line period T2H the picture signals S1, S2 and S3 are sequentially applied to the terminal Tc via the circuit MUXa during respective periods T2H1, T2H2 and T2H3.

The terminal Tc is connected to a terminal Ca of a capacitor C another terminal Cb of which is connected to ground. The capacitor C has such a high capacitance, of the order of for example 2 nF, that the black level signal SB occurring at the terminal Tc is present as is shown in FIG. 2. In this case it is assumed in accordance with FIG. 1 that the signal channel (EF2, PR2) with the picture signal S2 is connected to the terminal Tc via the circuit MUXa. The terminal Tc at which the black level signal SB occurs is coupled to a (+) input of a differential amplifier AM. In co-operation with the diode Db not shown of the peak rectifier circuit PR2 the capacitor C causes the black level BL to be present during the pixel periods TS2 and between them. The circuit AM is shown with a single differential amplifier for the sake of simplicity without further measures against voltage or current off-sets. A(−) input of the circuit AM is coupled to an output of a multiplex circuit MUXb which has three input terminals 1, 2 and 3 and is controlled by the switch-over signal Sb of FIG. 4. Three inputs of the circuit MUXb are connected to outputs of three adjustable reference voltage circuits RV1 RV2 and Rv3. A potentiometer has been shown by way of example for the adjustment in the circuit RV1. The circuits MUXb, RV1, RV2 and RV3 combined constitute a switchable reference voltage circuit (MUXb, RV). Likewise as the signal channel (EF2, PR2) is interconnected, as is shown in the circuit MUXa, the adjustable reference voltage circuit RV2 is simultaneously interconnected as is shown in the circuit MUXb. Instead of the switching and adjustable reference voltage circuit (MUXb, RV) a single adjustable or non-adjustable reference voltage circuit could be used. The advantage: of the embodiment shown in FIG. 1 will be further described hereinafter.

The output of the differential amplifier circuit AM is coupled to an input of a demultiplex circuit DEMUX to which the signal Sb of FIG. 4 is applied as the switching signal. Three output terminals of the circuit DEMUX indicated by 1, 2 and 3, with the terminal 2 being instantaneously interconnected, are coupled to storage circuits in the form of signal integration circuits SIC1, SIC2 and SIC3, respectively. In the circuit SIC1 the signal integration is indicated by an amplifier and a capacitor between amplifier input and output. The demultiplex circuit DEMUX and the integration circuits SIC which operate as storage circuits may otherwise be described as a signal sample and hold circuit. According to FIG. 1 the circuit SIC1 is succeeded by a control voltage circuit CV1 an output of which is coupled to a control voltage input of the peak rectifier circuit PR1. The peak rectifier circuits PR2 and PR3 are also connected to series arrangements (SIC2, CV2) and (SIC3, CV3). In the control voltage circuit CV1 a resistor has been shown by way of illustration which in practice will form part of a resistance network having a voltage source to which network the associated signal integration circuit SIC1 operating as a storage circuit supplies the control voltage. It is assumed that the circuits CV1, CV2 and CV3 supply a given control voltage VPL1, VPL2 and VPL3, respectively, so that the reset levels PL1, PL2 and PL3 occur in the picture signals S1, S2 and S3, respectively, of FIG. 2. The control voltage VPL1, VPL2 or VPL3 obtained via the adjustable reference voltage of the circuit RV1, RV2 and RV3, respectively, yields the desired reset level PL1, PL2 or PL3 via the diode Da in the relevant peak rectifier circuit PR3, whilst the bhck level BL is present in each signal S1, S2 or S3. With the aid of the specific a djustable reference voltages of the circuits RV1, RV2 and RV3 associated with the level difference between a level PL1, PL2 or PL3 and the level BL the deviations (off-sets) in signal processing operations in the shift registers SR1, SR2 and SR3 are compensated in such a manner that one and the same black level BL results. The simple construction of the switching and adjustable reference voltage circuit (MUXb, RV) is advantageous in this case, more specifically to obtain three slightly deviating black levels BL in the signals S1, S2 and S3 during the black level measuring periods T2H1, T2H2 and T2H3. These slight deviations during measurements are found to ensure in practice that one and the same black level BL is present in all three signals S1, S2 and S3 outside the line period T2H. Without the use of switching and the separate adjustment of the reference voltage black level deviations of the order of several microvolts may be present. If such deviations are allowed, a single reference voltage circuit RV connected to the (−) input of the amplifier circuit AM may be used.

The fact that the differential amplifier circuit AM in the control system is common for the black level clamping is essential because voltage and/or current off-sets which are always present during signal processing in the circuit have the same effect for all three sgnal channels (EF, PR) succeeding the sensor output terminals T1, T2 and T3. Three separate controls are found to be unsatisfactory in practice to obtain one and the same black level BL.

FIG. 4 shows that the second line with dark current information and the line period T2H is used for the control during black level clamping. This is shown by way of example. In this example the first line (line period T1H) and/or the third line (line period T3H) with the black level BL are available in the picture signal S0 for further known signal processing operations. Instead of one line period T2H one of the two line periods T1H and T3H could be used for black level control. In practice it is found to be sufficient or optimum to use one line period TH fro black level clamping and to perform clamping sequentially within this line period. FIG. 4 shows at the signal Sb that switching during black level clamping is effected in a regularly distributed manner over the line period T2H. A High-speed control system is the result. In the case of a line period TH which is equal to or more or less equal to 64 $\mu$us, 15 to 20 $\mu$us may be taken for the periods T2H1, T2H2 and T2H3, whilst the signal integration circuits SIC1, SIC2 and SIC3 operating as storage circuits more or less constantly retain the information during the field period TV which is equal to, for example, 20 or 16.67 ms. This shows that the demultiplex circuit DEMUX, the signal integration circuits SIC operating as storage circuits and the control voltage circuits CV co-operate as a signal sample and hold circuit having one input and three outputs for supplying the control voltages VPL1, VPL2 and VPL3.

The signal black level clamping has been described in the foregoing, starting from the described image sensor formed with the shielding strip B shown. Unlike the embodiment shown, the strip B may be contiguous to the storage member M. In another case the shielding strip may be present at right angles to the line scan direction, whilst the signal black level clamping circuits described are not operative on the line time base described, but on a time base of pixel periods.

WHAT IS CLAIMED IS:

1. A camera for recording television, photographic or cinematographic images including a solid-state image sensor in the form of a charge transfer device comprising a pick-up member, a storage member and a parallel-in-series-out shift register member having at least two shift registers, each being coupled to a distinct sensor output terminal, said storage and shift register members being shielded from incident light and said pick-up member being shielded from incident light over a strip, the image sensor in said camera being operative for obtaining a picture signal having a periodical picture information associated with a scene to be recorded and a periodical dark current information originating from below the said strip and being associated with a signal black level, said picture signal being obtained after a picture information integration period in the pick-up member and a charge transfer period for the transfer between pick-up member and storage member, characterized in that each sensor output terminal is coupled via an associated peak rectifier circuit for fixing a signal reset level to an associated input of a first multiplex circuit having two outputs for a respective coupling to a camera output terminal for supplying a composite camera picture signal, and to a capacitance terminal connected to a capacitor for carrying the signal black level, the capacitance terminal being coupled to an input of a differential amplifier circuit another input of which has a reference voltage circuit connected to it, an output of the differential amplifier circuit being coupled via a demultiplex circuit to series arrangements of a signal storage circuit and a control voltage circuit, each series arrangement being coupled to one of the associated peak rectifier circuits for applying a control voltage thereto to fix the signal reset level.

2. A camera as claimed in claim 1, characterized in that the multiplex circuit, the reference voltage circuit, which has a switchable construction, and the demultiplex circuit switch synchronously during at least one television line period in which dark current information is present in the picture signals.

3. A camera as claimed in claim 2, characterized in that synchronous switching is regularly distributed over one line period.

4. A camera as claimed in claim 1, characterized in that the reference voltage circuit which has a switchable construction comprises a second multiplex circuit and hence adjustable reference voltage circuits connectable to the input of the differential amplifier circuit, each reference voltage circuit being associated with one of the respective peak rectifier circuits.

* * * * *

UNITED STATES PATENT AND TRADEMARK OFFICE
CERTIFICATE OF CORRECTION

PATENT NO. : 4,734,775

DATED : March 29, 1988

INVENTOR(S) : Hendrik Blom

It is certified that error appears in the above-identified patent and that said Letters Patent is hereby corrected as shown below:

Claim 2, line 4, change "synchronouslv" to --synchronously--

Signed and Sealed this

Twenty-first Day of March, 1989

Attest:

Attesting Officer

DONALD J. QUIGG

Commissioner of Patents and Trademarks